United States Patent [19]

Myers

[11] Patent Number: 4,617,353

[45] Date of Patent: Oct. 14, 1986

[54] ELECTRICALLY CONDUCTIVE POLYMER BLEND

[75] Inventor: Ronald E. Myers, Strongsville, Ohio

[73] Assignee: The B. F. Goodrich Company, Akron, Ohio

[21] Appl. No.: 784,905

[22] Filed: Oct. 7, 1985

[51] Int. Cl.$^4$ .................. C08L 27/06; C08L 65/00; C08L 75/04

[52] U.S. Cl. .................................. 525/245; 525/203; 525/279; 525/455; 525/452; 525/186; 525/375

[58] Field of Search ............... 525/245, 279, 203, 417, 525/455, 186, 375, 452

[56] References Cited

U.S. PATENT DOCUMENTS 4,468,291  8/1984  Naarmann et al. .................... 204/13

FOREIGN PATENT DOCUMENTS 2124639  2/1984  United Kingdom ................ 525/417

OTHER PUBLICATIONS

De Paoli et al, *J. Chem. Soc.*, Chem. Commun., 1984, pp. 1015 and 1016.

Niwa et al, *J. Chem. Soc.*, Chem. Commun., 1984, pp. 817 and 818.

Furukawa, *American Metal Market/Metalworking News*, May 28, 1984, p. 8.

Myers, "Chemical Oxidative Polymerization as a Synthetic Route to Electrically Conductive Polypyrroles", B. F. Goodrich Goodrich, Jul. 9, 1985.

*Primary Examiner*—Allan M. Lieberman

*Attorney, Agent, or Firm*—James R. Lindsay; Alfred D. Lobo

[57] ABSTRACT

A chemical process is provided for forming an electrically conductive polymer blend in which polypyrrole is a minor component. The polypyrrole is formed from a pyrrole monomer, optionally substituted at the 3- and 4-positions. The process comprises forming a solution of a matrix polymer in an anhydrous liquid reaction medium, and, in situ, contacting pyrrole monomer with a polymerization initiator selected from the group consisting of anhydrous halides of iron, cobalt or nickel (Group VIII metal) at a temperature in the range from about $-20°$ C. to below about the boiling point of the solution, so as to form the polypyrrole in situ. The polypyrrole so formed contains a Group VIII metal halide counterion dispersed within the matrix polymer so as to produce a conductive polyblend having a conductivity in the range from about 1 to about 150 ohm$^{-1}$ cm$^{-1}$ ("S/cm" for brevity), or a semiconductor having a conductivity in the range from about $10^{-3}$ to abut 1 S/cm, depending upon the particular structures of the matrix polymer and the pyrrole monomer, the ratio of the initiator to pyrrole monomer, the order of addition of pyrrole monomer and initiator, and the molecular weight of the polypyrrole formed. The matrix polymer may be substituted with a polyblend which may contain two or more miscible or partially miscible polymers. The conductive polyblend formed retains such thermoformability of the matrix polymer as it had before it was made conductive by the in situ polymerization of the pyrrole monomer.

14 Claims, No Drawings

ELECTRICALLY CONDUCTIVE POLYMER BLEND

BACKGROUND OF THE INVENTION

This invention relates to organic conductors and semiconductors which are thermoformable conductive polyblends. More particularly, this invention relates to a conductive polyblend in which a pyrrole monomer is polymerized in situ, in a solution of a matrix polymer, by contacting the monomer with a polymerization initiator. The polyblend so formed is imbued with the desirable characteristics of the matrix polymer, yet acquires the conductivity derived from the presence of conductive polypyrrole. The term "polypyrrole" is used herein to connote a polymer of pyrrole or pyrrole substituted at one or both of its 3- and 4- positions.

As is well known, conducting polypyrroles defy conventional melt-processing, cannot be compacted, whether molded or extruded, in the usual ways, nor deposited as a continuous film from solution; and, they are far from stable in air even at ambient temperature conditions. A polymer which defies compaction into a shaped article, places severe limitations upon its use. Certain pyrrole polymers made by electrodeposition are found to be compactable (see copending U.S. patent application Ser. No. 486,161, filed Apr. 18, 1983), now U.S. Pat. No. 4,543,402, and to form self-supporting films, but this process is too slow for general commercial utility.

In copending application Ser. No. 618,701 filed June 8, 1984, now abandoned, I have disclosed a chemical process for coating an electrically non-conductive substrate such as poly(vinyl chloride) and certain inorganic materials, with a coating of conductive polypyrrole. Though this process is fast, only the coating of polypyrrole is conductive while the substrate under the coating remains non-conducting.

In many instances, particularly for fiber-reinforced synthetic resinous materials, and for high strength polyblends such as those commercially available as Noryl ® blend of styrene and poly(phenylene oxide), it was desirable to make the body of the resin conductive, not just the surface. Such instances arise when it is likely that a conductor will suffer surface damage but it is essential that such damage not affect the conductivity of the conductor. In other instances it is insufficient to provide only surface conductivity, as for example, in the preparation of porous conductive polymer membranes. Apart from those instances, such as those recited, where conductivity of the polymer mass is essential, it will be evident that being forced to provide an article of arbitrary shape with a conductive surface severely limits the options available as compared with those available when the entire body is conductive.

The problem was to find a relatively fast non-electrochemical process which yielded a thermoformable polyblend conductor (the term "conductor" as used herein includes semiconductors) so that the polypyrroles formed as part of the polyblend might be more versatile in their applications.

By "semiconductors" I refer to polymers of pyrrole/-substituted pyrrole monomers which have relatively low conductivity in the range from about $10^{-3}$ ohm$^{-1}$cm$^{-1}$ ("S/cm" for convenience to indicate reciprocal ohms/cm) to 1 S/cm, while "conductors" have a conductivity in the relatively high range of from 1 to about 150 S/cm.

Poly(2,5-pyrrole) (referred to herein as "PP" for brevity), in which the —NH— group links sequences of conjugated double bonds, is normally an insulator, that is, has a conductivity less than about $10^{-10}$ S/cm and is totally insoluble in known solvents. It is known however, that electrochemically polymerized PP has good conductivity, but coupled with its melt-processing-resistance and the poor integrity of PP film so formed, it was deemed more desirable to produce the PP with a chemical process. Others have also sought to do so. In particular, German (FDR) Offenlegungsshrift DE No. 3321281 A1 published Dec. 22, 1983 discloses a chemical process for producing a conductive paper by impregnating the paper with different concentrations of an aqueous ferric chloride solution which is acidified with HCl, then exposing the impregnated paper to pyrrole monomer, usually in the gaseous phase. Further details of this process are disclosed in an article titled "Some Properties of Polypyrrole-Paper Composites" by Bjorklund, R. B. and Lundstroem, I., *Journal of Electronic Materials,* Vol. 13, No. 1, 1984.

As also stated in Bjorklund et al, they were aware that anhydrous FeCl$_3$ used as a dopant with poly-p-phenylene exists as an FeCl$_4$ (2−) complex in the polymer matrix, thus imparting conductivity to the polymer. Other polymers, for example polyacetylene impregnated with FeCl$_3$ or other oxidants such as SbCl$_5$, and, neutral polypyrrole which is exposed to FeCl$_3$ vapor or an anhydrous solution of the electrolyte, is also made conductive. But impregnating a preformed polymer with FeCl$_3$ to make it conductive does not suggest that one may use anhydrous FeCl$_3$ as an initiator to form the polymer from the pyrrole monomer, or that the FeCl$_3$ would generate a charged species in the polymer formed. As is well-known, poly-p-phenylene cannot be formed by initiation with FeCl$_3$ (see "Reaction of Ferric Chloride with Benzene", by P. Kovacic and C. Wu, *J. Polym. Sci.* Vol XLVII pg. 45-54 at pg. 45, first sentence of "Results", 1960), and the polymer is not conductive unless post-treated with FeCl$_3$.

With respect to polymers of 3- and/or 4- substituted pyrroles ("subs PP"), Bjorklund et al corroborate the generally well known fact that providing substituents on pyrrole does not improve the conductivity of the subs PP. Yet, with the process of my invention, a polyblend containing a minor amount by weight of a designated subs PP has relatively good conductivity.

As noted by Bjorklund et al, their precipitated PP was compactable under 10 ton pressure to form a wafer. Polyblends formed with PP/subs PP precipitated in situ by my polymerization reaction is compacted and thermoformed by extrusion, injection molding and the like, under substantially the same conditions as those for the matrix polymer which forms the major component by wt. in the polyblend.

SUMMARY OF THE INVENTION

I have discovered that pyrrole, optionally substituted with a wide variety of substituents in the 3- and/or 4- positions, may be polymerized in situ, in a chemical, but non-electrochemical reaction, to form a polyblend of poly(2,5-pyrrole) and another polymer, referred to herein as a "matrix" polymer, which polyblend is conductive, and, is substantially as thermoformable as the matrix polymer by itself. Thus, a matrix polymer which is normally an insulating substrate, is converted to a conductive polyblend having a conductivity in the range from about $10^{-3}$ to about 150 S/cm.

It is therefore a general object of this invention to provide a process for forming an electrically conductive polyblend of a PP/subs PP polymer and a matrix polymer, comprising, (a) forming a solution of said matrix polymer in a liquid solvent in which the matrix polymer is substantially soluble, (b) forming a poly(2,5-pyrrole) in situ, in said solution by contacting (i) a finely divided anhydrous polymerization initiator selected from the group consisting of halides of the Group VIII metal selected from iron, cobalt and nickel, with (ii) an anhydrous essentially pure liquid pyrrole monomer, optionally in solution with the matrix polymer, at a temperature in the range from above the freezing point of said solution of matrix polymer to below its boiling point, so as to form said poly(2,5-pyrrole) which contains an ion selected from the group consisting of the Group VIII metal, halogen, and combinations thereof as charged species, said monomer having the structure

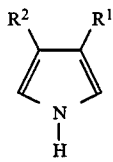
(I)

wherein, $R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, and benzyl which may optionally be ring-substituted with halogen or lower alkyl having from 1 to about 6 carbon atoms;

$R^2$ is selected from the group consisting of hydrogen, hydroxyphenyl which may be ring-substituted, and an acyclic ether selected from the group consisting of (i) alkoxy represented by $-OR^3$, wherein $R^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3-OCH_2CH_2-]_{n'}$, wherein $n'$ is an integer in the range from 1 to about 20; and (iii) $R^4-O-R^5$ wherein either $R^4$ or $R^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different;

whereby said polyblend formed consists essentially of a PP/subs PP phase substantially homogeneously blended with said matrix phase, said polyblend having a conductivity in the range from about $10^{-3}$ to about 150 ohm$^{-1}$ cm$^{-1}$ ("S/cm").

· It is also a general object of this invention to provide a thermoformable, conductive polyblend consisting essentially of a normally insulating matrix polymer having a conductivity in the range from about $10^{-15}$ to $10^{-6}$ S/cm and a conductive PP/subs PP, which polyblend has a conductivity in the range from $10^{-3}$ to about 150 S/cm, due to chemically forming the PP/subs PP phase distributed homogeneously within the matrix polymer phase.

It is a specific object of this invention to provide a process in which the conductivity of a polyblend of PP/subs PP and a matrix polymer, which polyblend is thermoformable into an article of arbitrary shape, may be tailored to produce (i) a semiconductor ($10^{-3}$ to 1 S/cm) by maintaining a molar ratio of initiator to pyrrole monomer in the range of from about 0.1 to about 1, more preferably about 0.25 to 1, in an anhydrous solution of a major amount by weight of matrix polymer, relative to pyrrole monomer; and, (ii) a conductor (1 to 150 S/cm) by controlling the order of addition of initiator and pyrrole monomer, and maintaining a molar ratio of initiator to pyrrole monomer in the range from 1 to about 20, more preferably 1 to about 10, in a saturated solution of initiator in the solution of matrix polymer.

It is another specific object of this invention to provide a process in which one may produce a conductive polyblend of PP/subs PP and a matrix polymer present in a ratio sufficient to permit the polyblend to be thermoformed, by maintaining the aforespecifed molar ratio in a dialkyl ether in which $FeCl_3$ (anhyd) is soluble, as is the pyrrole monomer, so that a maximum value of S/cm is reached.

It is also a specific object of this invention to provide a process for making conductive polyblend having a conductivity in the range from $10^{-1}$ to about 150 S/cm for use in EMI shielding, antistatic packaging, and, backing for dielectric paper, inter alia.

It is also a general object of this invention to provide porous conductive membranes, more particularly microporous conductive membranes having a pore diameter in the size range from about 0.05 micron to about 20 microns in polyblends of PP/subs PP with a wide variety of homopolymers and copolymers. The conductivity of the polyblend may be tailored to make a separation of particles, or molecules and particularly ions which will pass through the membrane. The polyblend may be reinforced with fiber or fabric to obtain desirable mechanical rigidity and strength.

It is therefore a specific object of this invention to provide conductive porous polyblends of PP/subs PP with a synthetic resinous material which may be formed into a sheet and used as a conductive membrane.

It is yet another general object of this invention to provide a polyblend of PP/subs PP and a normally non-conductive polymer which polyblend may be thermoformed into a flexible electrode of arbitrary shape.

DETAILED DESCRIPTION OF PREFERRED EMBODIMENTS

The electrically conductive, thermoformable polyblend of this invention consists essentially of (i) a normally insulating synthetic resinous matrix ("matrix polymer") and, (ii) a poly(2,5-pyrrole), denoted by "PP/subs PP" distributed substantially homogeneously within the polyblend. The level of crystallinity of the matrix polymer, and whether the PP/subs PP is miscible with the matrix polymer, are factors which affect the conductivity and thermoformability of the polyblend but quite surprisingly, do not prevent formation of the polyblend.

The PP/subs PP phase in the polyblend may be represented by the structure

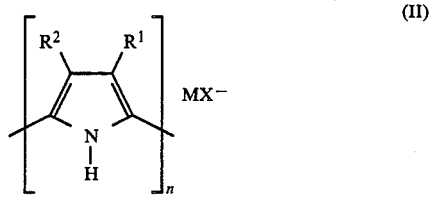

(II)

wherein, n is an integer in the range from 2 to about 100, and more preferably in the range from about 5 to about 20;

M represents a Group VIII metal selected from the group consisting of iron, nickel, and cobalt;

X represents chlorine, or bromine; and, $R^1$ and $R^2$ have the same connotation as that given hereinabove.

In the process of this invention, particles of PP/subs PP are precipitated, under anhydrous conditions, from an inert liquid reaction medium in which the matrix polymer is substantially soluble. By "substantially soluble" I refer to a solubility of at least 5 parts by wt. of matrix polymer to 100 parts by wt ("5 pph") of solvent. It is most preferred to use a solvent in which the matrix polymer is highly soluble, preferably in an amount greater than 25 pph of solvent.

Though it will be evident that the in situ polymerization of the pyrrole monomer is carried out in the solution of matrix polymer, by "inert liquid reaction medium" (or "reaction medium" for brevity) I specifically refer to the solvent for the matrix polymer, which solvent is an organic liquid essentially unreactive with the polymerization inititator, or the matrix polymer, or the monomer, unless the reaction medium is a coordinating solvent. For the anhydrous $FeCl_3$ Meek & Drago coordination model see "The Chemistry of Non-Aqueous Solvents" edited by J. J. Lagowski, Vol I, Academic Press, New York (1966). By "anhydrous" conditions I refer to the reaction being carried out in the absence of moisture, particularly that the polymerization initiator be essentially free from bound water such as water of hydration.

It is most preferred that the reaction medium be a solvent for the initiator, the pyrrole monomer and the matrix polymer. Where the reaction medium is a solvent for the matrix polymer and not the pyrrole monomer or the initiator, plural solvents may be used. It is preferred, when plural solvents are used, for example, a first solvent for the matrix polymer, a second solvent for the initiator and a third solvent for the pyrrole monomer, that one solvent, say the third solvent, is a co-solvent for the solution of the initiator and the solution of the matrix polymer. Where the initiator is used as a dispersion in a reaction medium in which the initiator is essentially insoluble, the conductivity of the polyblend formed may be lower than $10^{-3}$ S/cm. To enhance the conductivity obtained, the initiator is preferably used as a finely divided powder having a particle size in the range from about 5 microns to about 45 microns.

When the reaction medium is a solvent for the initiator, or the initiator is dissolved in a second solvent to form a solution which is miscible, that is, homogeneously distributed in the solution of the matrix polymer, it is preferred that the second solvent be saturated with initiator. It is not essential that the initiator be highly soluble in the second solvent, and in most cases, its solubility is limited. By "soluble" initiators I refer to those having a solubility in the range from about 5 to about 25 pph of solvent, a few initiators being more soluble. A solubility of less than 5 pph is generally ineffective for the purpose of providing desirable speed of reaction.

Preferred initiators are the halides of iron, cobalt and nickel, preferably the chloride and bromides. Where stable iodides are used, the reactivity is generally not comparable to the chlorides which are more preferred, for example ferric chloride, nickel chloride and cobalt chloride, and the bromides such as ferric bromide, cobalt bromide and nickel bromide, which are less preferred, all in the +3 state.

The amount of initiator used and its "freshness" generally controls the speed of the reaction and the molecular weight of the PP/subs PP formed in the polyblend, the conductivity of which is affected. By "freshness" I refer to initiator which has not been aged, particularly by exposure to the atmosphere.

If the initiator is essentially insoluble in the reaction medium, more initiator is generally required than if the initiator is soluble. Even when the initiator is soluble, it is preferably used in a major molar amount relative to the monomer, and preferably in the range from above 1 to about 20 moles of initiator per mole of monomer, lesser amounts typically yielding lower than $10^{-3}$ S/cm. Where the molar ratio of initiator to monomer is in the range from about 0.1 to about 1, and preferably from about 0.25 to 1, the polyblend formed is a semiconductor. Where the molar ratio of initiator to monomer is in the range from about 1 to about 20, and more preferably from 1 to about 10, the polyblend formed is a conductor.

Unless the reaction medium used is a coordinating solvent, the particular solvent used is not narrowly critical except to the extent that it influences the properties of the polymer obtained, the extent of the influence usually being determined by simple trial and error such as one in this art would routinely expect to do.

A solvent in which there is no significant covalent bonding to the Group VIII metal of the initiator but nevertheless permits initiation of the polymer and its subsequent doping, is referred to herein as an "inert liquid" though it may have a solvating effect.

Liquids in which the initiator is poorly if at all soluble include the alkanes such as hexane, and cycloalkanes such as cyclohexane, all having from 4 to about 8 carbon atoms; aromatic liquids such as benzene, toluene and xylene; methoxy-xylene, nitro-xylene; halogenated aromatic liquids such as chlorobenzene, chlorotoluenes and chloroxylenes; hydrohalomethylenes particularly hydrochloromethylenes; chloroform, perchloroethylene and carbon tetrachloride; sulfolane, 1,4-dioxane and dimethyl sulfone; and, lower primary alcohols having from 1 to about 6 carbon atoms; inter alia. Liquids in which the initiator is soluble include nitromethane and nitrobenzene; essentially unbranched dialkyl ethers having from 4 to about 20 carbon atoms, most preferably diethyl ether; propylene carbonate and N-methyl-2-pyrrolidone, and the like.

The matrix polymer is preferably any normally electrically non-conducting polymer which is thermoformable, though polymers not generally regarded as conveniently thermoformable, such as polyphenylene oxide ("PPO"), may also form a polyblend with PP/subs PP. Of particular interest for the formation of conductive polyblends of this invention are copolymers of butadiene with acrylic acid, alkyl acrylates or methacrylates, polyisoprene, polychloroprene, and the like; polyurethanes; vinyl polymers known as PVC resins such as poly(vinyl chloride), copolymers of vinyl chloride with vinylidene chloride, copolymers of vinyl halide with butadiene, styrene, vinyl esters, and the like; polyamides such as those derived from the reaction of hexamethylene diamine with adipic or sebacic acid; epoxy resins such as those obtained from the condensation of epichlorohydrin with bisphenols, and the like; ABS resins, polystyrene, polyacrylonitrile, polymethacrylates, polycarbonates, phenol-formaldehyde resins, polyepoxides, polyesters, and polyolefin homo- and copolymers such as polyethylene, polypropylene, ethylene-propylene polymers, ethylene-propylenediene polymers, ethylene vinyl acetate polymers and the like. Mixtures and blends of polymeric materials such as ABS resin blends, PVC and polymethacrylate blends, elastomer blends of PVC and polyester prepared from short chain aliphatic glycol and diacid monomers such as are disclosed in U.S. Pat. No. 3,574,789, and blends of homopolymers and copolymers such as blends of polypropylene in EPDM polymers, may also be rendered conductive by my in situ polymerization process.

Among the foregoing polymers, those which can be formed into porous sheets may be made conductive as polyblends with PP/subs PP and formed by conventional processes into conductive porous membranes. Cellulose esters, PVC, and high temperature aromatic polymers may each be dissolved in a solvent to provide the matrix polymer in which PP/subs PP is precipitated as an immiscible phase, but nevertheless forms a conductive polyblend which upon coagulation (by a nonsolvent) of the solution in which the polyblend is dispersed yields a porous membrane comparable to commercially available Millipore ® materials. Fine particles of a polyblend of poly(tetrafluoroethylene) and polypyrrole may be sintered to form a membrane comparable to Gore-Tex ® membrane. By controlled stretching of a sheet of a polyblend of polypropylene and polypyrrole a porous membrane similar to Celguard ® may be produced, though other techniques such as the liquid phase separation of the polyblend in the solution of matrix polymer by cooling, may also provide porous membranes comparable to known membranes, such as Accurel ® except that they are conductive polyblends of polymers which are essentially immiscible as evidenced by their presence as separate phases in the polyblend.

Of great importance is the ease and simplicity with which the thermoformable conductive polyblends of this invention may be produced. Typically, the matrix polymer is preferably dissolved in a solvent in which the polymer is essentially completely soluble and anhdrous FeCl$_3$ dissolved in a solvent which is miscible with the solvent for the matrix polymer is added. A large excess of FeCl$_3$ is preferably used to obtain a conductivity in the high range above 1 S/cm. The pyrrole is then added to the mixture with stirring. If the pyrrole is a solid, as are some ether-substituted pyrroles, the solid is first dissolved in a cosolvent so that the subs PP precipitated is distributed essentially homogeneously in the matrix polymer.

The invention is more fully described by the following illustrative examples.

EXAMPLE 1

Polymerization of Pyrrole in a solution of Polystyrene ("PS") by addition of pyrrole monomer to a solution of PS containing ferric chloride A. Anhydrous FeCl$_3$ (6.0 g) was dissolved in 50 ml of diethyl ether and this solution was added to 25 ml of ethylacetate in which 2 g of Styron ® 685 PS had been dissolved. The resulting PS/FeCl$_3$ solution was stirred at 22° C. under nitrogen while 0.4 ml of pyrrole was added to it in a single portion. The reaction mixture instantly acquired the black color characteristic of polypyrrole formation. After being stirred for 1 hr at 22° C., the reaction mixture was poured into 600 ml of methanol. The resulting precipitate was filtered off, washed with methanol, and finally with diethyl ether. The black solid was then vacuum dried for 4 hr at 65° C. to yield 1.76 g of product which was a polyblend of PS containing about 15% by volume of polypyrrole essentially homogeneously distributed within the PS.

The product was cryogenically ground and a four-point probe conductivity measurement was taken on a pressed disc of the material. The conductivity was $1.3 \times 10^{-1}$ S/cm. The material can be pressed into a coherent film at 400° F. and 40,000 psi.

B. In a manner analogous to that described in example 1A above, the amount of pyrrole polymerized in the PS was increased so that the polyblend of PS and polypyrrole contained 30% by vol of polypyrrole. Again, the polyblend was shapable by thermoforming and has a conductivity of 2.5 S/cm.

EXAMPLE 2

Polymerization of Pyrrole in a solution of Polystyrene ("PS") by addition of ferric chloride to a solution of PS containing pyrrole monomer 4.0 g (0.025 mole) of anhydrous FeCl$_3$ is dissolved in 40 ml of diethyl ether. This solution is added, over a period of 10 min to a solution of 2.0 g Styron 685 PS, 25 ml of ethylacetate and 0.4 ml pyrrole. As the FeCl$_3$ solution is added to the PS/pyrrole solution at 22° C. under nitrogen, the solution acquires the characteristic black color indicating polypyrrole formation. The reaction mixture is stirred at 22° C. for 1 hr and is then poured into 500 ml of methanol. The resulting black precipitate is filtered and washed with 3×200 ml of methanol, followed by a final wash with diethyl ether. After vacuum drying at 65° C., the yield of product which was a polyblend of PS containing about 15% by volume of polypyrrole essentially homogeneously distributed within the PS, is found to be 1.75 g.

The product was cryogenically ground and a four-point probe conductivity measurement was taken on a pressed disc of the material. The conductivity was $1.6 \times 10^{-2}$ S/cm. The material can be pressed into a coherent film at 400° F. and 40,000 psi.

The foregoing procedure illustrates the effect of the order of addition of FeCl$_3$ and pyrrole to the solution of PS. By adding FeCl$_3$ to the pyrrole dispersed in the solution of polymer, the conductivity is effectively reduced.

EXAMPLE 3

Polymerization of Pyrrole in a solution of Poly(vinyl chloride) (PVC) by addition of pyrrole monomer to a solution of PVC containing ferric chloride A. 2.0 g of Geon ®103EP PVC was dissolved in 50 ml of nitrobenzene at 22° C. and 3.04 g of anhydrous FeCl$_3$ was then added, in a single portion, to the PVC/FeCl$_3$ solution. A black color characteristic of polypyrrole formation appeared immediately upon addition of the pyrrole. The reaction was stirred at room temperature under a nitrogen atmosphere for 45 min after which time the mixture was poured into 500 ml of methanol, resulting in formation of a black solid. The polypyrrole/PVC solids were recovered by filtering, washing with methanol until the washings were colorless, and then rinsing with diethyl ether. The solids were then vacuum dried for 4 hr at 65° C. to yield 2.17 g of a thermoformable polyblend.

The product, containing about 20% by volume of polypyrrole essentially homogeneously distributed within the PVC, was cryogenically ground and a four-point probe conductivity measurement was taken on a pressed disc of the material. The conductivity was $9 \times 10^{-3}$ S/cm. The polypyrrole contains a counterion consisting of iron and chlorine present in an atom ratio of Fe/Cl in the range 1:3 to about 1:4. The product can be pressed into a coherent film at 400° F. and 40,000 psi.

B. In a manner analogous to that described in 1A above, the amount of pyrrole polymerized in the PVC was increased so that the polyblend of PVC and polypyrrole contained about 45% by vol of polypyrrole. Again, the polyblend was shapable by thermoforming and has a conductivity of 11 S/cm.

EXAMPLE 4

Polymerization of Pyrrole in a liquid acrylic acid/ethyl acrylate (Carboset ®531) copolymer by addition of FeCl$_3$ 1.0 ml of pyrrole is added with stirring to 10 g of Carboset ®531 copolymer. 6.0 g of anhydrous FeCl$_3$ is then added to the Carboset/pyrrole system resulting in a slight exotherm and the reaction mixture acquires a black color. This system is held at room temperature with stirring for 30 min. The black solid portion of the reaction mixture is washed thoroughly with water until the washings are colorless, then rinsed with ethyl alcohol and ether. After vacuum drying at 50° C. for 2 hr the product is cryogenically ground and the resulting powder is again washed with water, rinsed with ethyl alcohol and ether and vacuum dried for 4 hr at 65° C. The yield is 3.3 g of solid which was a polyblend of copolymer containing about 25% by volume of polypyrrole essentially homogeneously distributed within the copolymer.

The product was cryogenically ground and a four-point probe conductivity measurement was taken on a pressed disc of the material. The conductivity was $1 \times 10^{-4}$ S/cm. The material can be pressed into a coherent film at 400° F. and 40,000 psi.

EXAMPLE 5

Polymerization of Pyrrole in a solution of Nylon 6/6 by addition of pyrrole monomer to a solution of nylon 6/6 containing ferric chloride Nylon 6/6 (10 g) was dissolved in 25 ml of 2,2,2-trifluoroethanol at room temperature (22° C.). To this solution was added 25 ml of a 2,2,2-trifluoroethanol solution/suspension of FeCl$_3$ (3.8 g). The addition of the FeCl$_3$ to the nylon resulted in partial precipitation of the nylon. Pyrrole (0.42 ml) was then added to the FeCl$_3$/nylon reaction mixture. An immediate black color appeared upon addition of the pyrrole. After stirring for 1 hr at room temperature under nitrogen, the reaction mixture was poured into 200 ml of water. The black product was filtered, washed with water until the washings were colorless, and then rinsed with ethanol and diethyl ether. The product was vacuum dried for 4 hr at 65° C. to yield 1.38 g of product containing about 30% by volume of polypyrrole essentially homogeneously distributed within the polymer.

The product was cryogenically ground and a four-point probe conductivity measurement was taken on a pressed disc of the material. The conductivity was $8.5 \times 10^{-1}$ S/cm. The material can be pressed into a coherent film at 400° F. and 40,000 psi.

EXAMPLE 6

Polymerization of Pyrrole in a solution of Polyurethane by simultaneous addition of pyrrole monomer and polyurethane solution to an anhydrous solution of ferric chloride 10.9 g of anhydrous FeCl$_3$ are dissolved in 150 ml of diethyl ether at 10° C. under nitrogen in a 3-necked flask equipped with two pressure equalizing funnels. Into one funnel is placed 2 g of Estane ®58300 polyurethane dissolved in 25 ml of THF. 1.2 ml of pyrrole is placed in the other funnel. The Estane/THF solution and the pyrrole were then added simultaneously to the FeCl$_3$/diethyl ether solution over a 3 min period. A black precipitate is formed instantly. Both the polyurethane and the polypyrrole are insoluble in diethyl ether. After stirring the reaction mixture for 1 hr at 10° C., the black product is filtered off, washed with nitromethane until the washings are colorless and then rinsed with diethyl ether. After the product was vacuum dried for 4 hr at 65° C. a yield of 3.48 g of product containing about 50% by volume of polypyrrole essentially homogeneously distributed within the polyurethane is obtained.

The product was cryogenically ground and a four-point probe conductivity measurement was taken on a pressed disc of the material. The conductivity was 1.4 S/cm. The material can be pressed into a coherent black, shiny, film at 400° F. and 40,000 psi. The surface resistivity was 6 ohm/square at 0.007 inch thickness.

EXAMPLE 7

Polymerization of Pyrrole in a solution of Polyurethane by addition of ferric chloride to a solution of polyurethane containing pyrrole monomer 2.0 g of Estane 58300 polyurethane is dissolved in 25 ml of N-methyl-2-pyrrolidone and 0.4 ml of freshly distilled pyrrole is added to this solution. The resulting solution is then added incrementally over a 10 min period to a solution consisting of 6.0 g of anhydrous FeCl$_3$ in 50 ml diethyl ether.

After stirring the mixture for 30 min at room temperature under nitrogen, the mixture is poured into 300 ml of methanol. The dark grey-black precipitate is washed with methanol until the washings are clear, followed by washing with diethyl ether. After vacuum drying at 50° C. for 2 hr. the product is cryogenically ground and the resulting powder is again washed with water, rinsed with ethyl alcohol and ether and vacuum dried for 4 hr at 65° C. The yield is 1.3 g of solid which was a polyblend of polyurethane containing about 15% by volume of polypyrrole essentially homogeneously distributed within the copolymer.

The product was cryogenically ground and a four-point probe conductivity measurement was taken on a pressed disc of the material. The conductivity was $1.1 \times 10^{-3}$ S/cm. The material can be pressed into a coherent film at 400° F. and 40,000 psi.

Because it is easy to handle and conveniently available, pyrrole has been used as the monomer in each of the foregoing examples, but some of the ether-substituted and hydroxy-substituted pyrroles, in particular among other substituted pyrroles, provide excellent conductivities in polyblends. Such substituted pyrroles as 4-(4-hexyloxyphenyl)-3-methylpyrrole, 3-ethoxy-4-methylpyrrole and 3-(2-ethoxy-5-pyridiyl)-4-ethylpyrrole may be prepared as disclosed in copending patent application Ser. No. 486,161, the disclosure of which is incorporated by reference thereto as if fully set forth herein.

I claim:

1. A process for preparing an electrically conductive polyblend of a polypyrrole or substituted polypyrrole and a thermoformable, normally insulating matrix polymer, comprising, (a) forming a solution of said matrix polymer in a liquid solvent in which the matrix polymer is substantially soluble, and, (b) forming a poly(2,5-pyrrole) in situ in said solution by contacting (i) a finely divided anhydrous polymerization initiator selected from the group consisting of halides of a Group VIII metal selected from iron, cobalt and nickel, with (ii) an anhydrous essentially pure liquid pyrrole monomer in a ratio of initiator to pyrrole monomer in the range of from about 0.1 to about 1, optionally in solution with the matrix polymer, at a temperature in the range from above the freezing point of said solution of matrix polymer to below its boiling point, so as to form said poly(2,5-pyrrole) which contains an ion selected from the group consisting of said Group VIII metal, halogen, and combinations thereof as charged species, said monomer having the structure

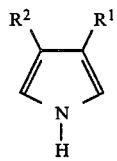

wherein, $R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, and benzyl which may optionally be ring-substituted with halogen or lower alkyl having from 1 to about 6 carbon atoms;

$R^2$ is selected from the group consisting of hydrogen, hydroxyphenyl which may be ring-substituted, and an acyclic ether selected from the group consisting of (i) alkoxy represented by —$OR^3$, wherein $R^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3$—$[OCH_2CH_2]_{n'}$— wherein $n'$ is an integer in the range from 1 to about 20; and (iii) $R^4$—O—$R^4$ wherein either $R^4$ or $R^5$ is a linking group selected from phenyl and benzyl, each of which may be substituted, alkyl having from 1 to 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different; whereby said polyblend formed consists essentially of a PP/subs PP phase homogeneously blended with said matrix polymer phase, said polyblend having a conductivity in the range from $10^{-3}$ to about 150 S/cm.

2. The process of claim 1 wherein said pyrrole monomer is present in a minor amount by weight relative to said matrix polymer in said polyblend.

3. The process of claim 1 wherein said pyrrole monomer is added to a solution of said matrix polymer in which said polymerization initiator is dissolved, and said conductivity is in the range from $10^{-2}$ to about $10^2$ S/cm.

4. The process of claim 1 wherein said polymerization initiator is added to a solution of said matrix polymer in which said pyrrole monomer is dispersed and said conductivity is in the range from about $10^{-3}$ to $10^{-2}$ S/cm.

5. The process of claim 1 wherein said polymerization initiator and said pyrrole monomer are added substantially simultaneously to said solution of matrix polymer.

6. The process of claim 1 wherein said polymerization initiator is present in an amount in the range from about 0.1 mole to about 10 moles per mole of said monomer.

7. The process of claim 2 wherein said polymerization initiator is dissolved in an anhydrous solvent which is a cosolvent for said matrix polymer.

8. The process of claim 6 wherein said polymerization initiator is selected from the group consisting of ferric chloride, nickel chloride and cobalt chloride.

9. The process of claim 8 wherein said monomer is pyrrole.

10. A thermoformable conductive polyblend consisting essentially of (i) a thermoformable, normally insulating matrix polymer and (ii) a polypyrrole or substituted polypyrrole substantially homogeneously distributed within said matrix polymer, said polypyrrole or substituted polypyrrole containing an ion selected from the group consisting of said Group VIII metal, halogen, and combinations thereof as charged species, said polypyrrole or substituted polypyrrole having the structure

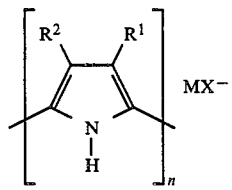

wherein,
n is an integer in the range from 2 to about 100, and more preferably in the range from about 5 to about 20;

M represents a Group VIII metal selected from the group consisting of iron, nickel, and cobalt;

X represents chlorine, fluorine or bromine;

$R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, and benzyl which may optionally be ring-substituted with halogen or lower alkyl having from 1 to about 6 carbon atoms;

$R^2$ is selected from the group consisting of hydrogen, hydroxyphenyl which may be ring-substituted, and an acyclic ether selected from the group consisting of (i) alkoxy represented by $-OR^3$, wherein $R^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3-[OCH_2CH_2]_{n'}-$ wherein $n'$ is an integer in the range from 1 to about 20; and (iii) $R^4-O-R^4$ wherein either $R^4$ or $R^5$ is a linking group selected from phenyl and benzyl, each of which may be substituted, alkyl having from 1 to 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different;

whereby said polyblend has a conductivity in the range from $10^{-3}$ to about 150 S/cm.

11. The thermoformable conductive polyblend of claim 10 wherein said polypyrrole or substituted polypyrrole is present in a minor amount by weight relative to said matrix polymer.

12. The thermoformable conductive polyblend of claim 11 wherein said polypyrrole or substituted polypyrrole is present as an immiscible phase in said matrix polymer.

13. The thermoformable conductive polyblend of claim 12 wherein said polypyrrole or substituted polypyrrole is unsubstituted and said matrix polymer is selected from the group consisting of poly(vinyl chloride) and a polyurethane derived from an aromatic diisocyanate and an aliphatic polyether polyol.

14. A conductive porous membrane consisting essentially of a polyblend of (i) a thermoformable, normally insulating matrix (polymer) and (ii) a polypyrrole or substituted polypyrrole substantially homogeneously distributed within said matrix polymer, said polypyrrole or substituted polypyrrole containing an ion selected from the group consisting of said Group VIII metal, halogen, and combinations thereof as charged species, said polypyrrole or substituted polypyrrole having the structure

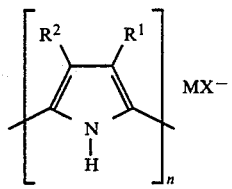

wherein,
n is an integer in the range from 2 to about 100, and more preferably in the range from about 5 to about 20;

M represents a Group VIII metal selected from the group consisting of iron, nickel, and cobalt;

X represents chlorine, fluorine or bromine;

$R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, and benzyl which may optionally be ring-substituted with halogen or lower alkyl having from 1 to about 6 carbon atoms;

$R^2$ is selected from the group consisting of hydrogen, hydroxyphenyl which may be ring-substituted, and an acyclic ether selected from the group consisting of (i) alkoxy represented by $-OR^3$, wherein $R^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3-[OCH_2CH_2]_{n'}-$ wherein $n'$ is an integer in the range from 1 to about 20; and (iii) $R^4-O-R^4$ wherein either $R^4$ or $R^5$ is a linking group selected from phenyl and benzyl, each of which may be substituted, alkyl having from 1 to 24 carbon atoms, and cycloalkyl having from 3 to about 7 ring carbon atoms one or more of which may be substituted; and, $R^1$ may be substituted with $R^2$, and if so substituted, each $R^2$ substituent may be the same or different;

whereby said membrane has a conductivity in the range from $10^{-3}$ to about 150 S/cm.

* * * * *